(12) United States Patent
Seidel

(10) Patent No.: US 7,364,029 B2
(45) Date of Patent: Apr. 29, 2008

(54) APPARATUS FOR SIMULTANEOUSLY CONVEYING AND ROTATING OBJECTS

(75) Inventor: Jens Seidel, Mainz (DE)

(73) Assignee: HELMUT Seidel, Walluf (DE)

( * ) Notice: Subject to any disclaimer, the term of this patent is extended or adjusted under 35 U.S.C. 154(b) by 46 days.

(21) Appl. No.: 11/478,684

(22) Filed: Jun. 30, 2006

(65) Prior Publication Data

US 2007/0000755 A1 Jan. 4, 2007

(30) Foreign Application Priority Data

Jul. 1, 2005 (EP) ................................ 05 014 325

(51) Int. Cl.
B65G 47/08 (2006.01)
(52) U.S. Cl. .................. 198/376; 198/377.08; 198/378
(58) Field of Classification Search ................ 198/376, 198/377.01, 377.03, 377.04, 377.06, 377.08, 198/377.07, 378
See application file for complete search history.

(56) References Cited

U.S. PATENT DOCUMENTS 5,261,520 A * 11/1993 Duke .......................... 198/375
5,921,375 A * 7/1999 van Laar .................. 198/471.1
6,484,478 B1 * 11/2002 Arends et al. ................ 53/544

2003/0010438 A1 1/2003 Tharpe, Jr. et al.
2005/0077148 A1 * 4/2005 Dombek .................. 198/475.1

FOREIGN PATENT DOCUMENTS

EP 0769459 A1 4/1997
EP 1020359 A2 7/2000

* cited by examiner

Primary Examiner—Mark A. Deuble
(74) Attorney, Agent, or Firm—Price, Heneveld, Cooper, DeWitt & Litton, LLP

(57) ABSTRACT

An apparatus for conveying and simultaneously turning objects has a first conveyor device for conveying the objects into the area of two conveyor-turning stations and a second conveyor device for conveying the objects out of the area of the conveyor-turning stations. The conveyor-turning stations have a conveyor that rotates horizontally and at least one turning device for contacting and turning the objects. The two conveyor-turning stations are used for alternate conveying of the objects along a common conveyor path. Each conveyor-turning station can be driven by its own electric motor with controllable speed. In an access area of the conveyor-turning stations, there is a device for detecting the position of the next object to be contacted and to be conveyed by the respective conveyor-turning station. The detecting device controls the electric motors in such a way that upon detection of an object passing by, the detecting device triggers one electric motor and upon detection of the object immediately following the object passing by, the detecting device triggers the other electric motor.

18 Claims, 3 Drawing Sheets

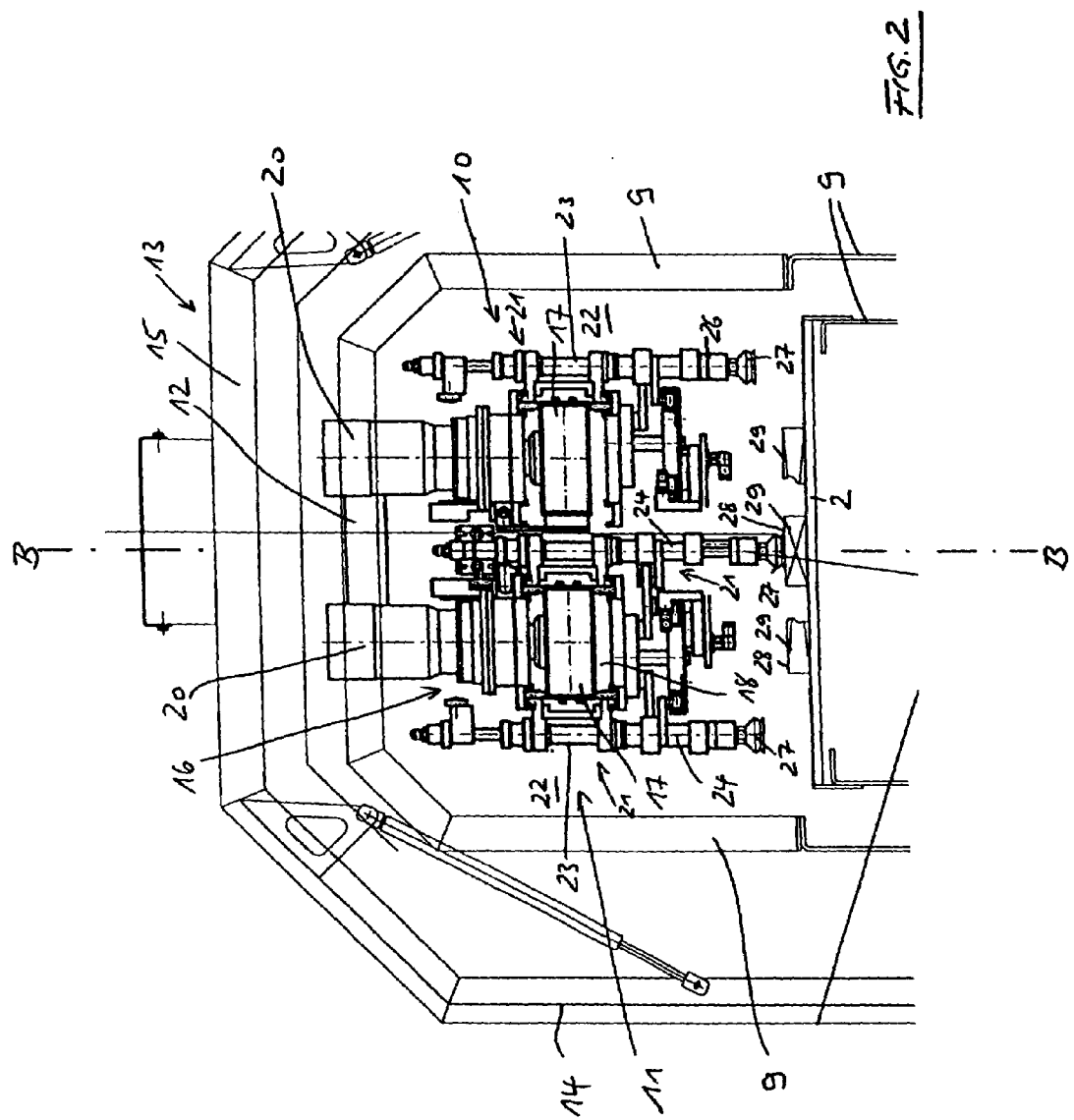

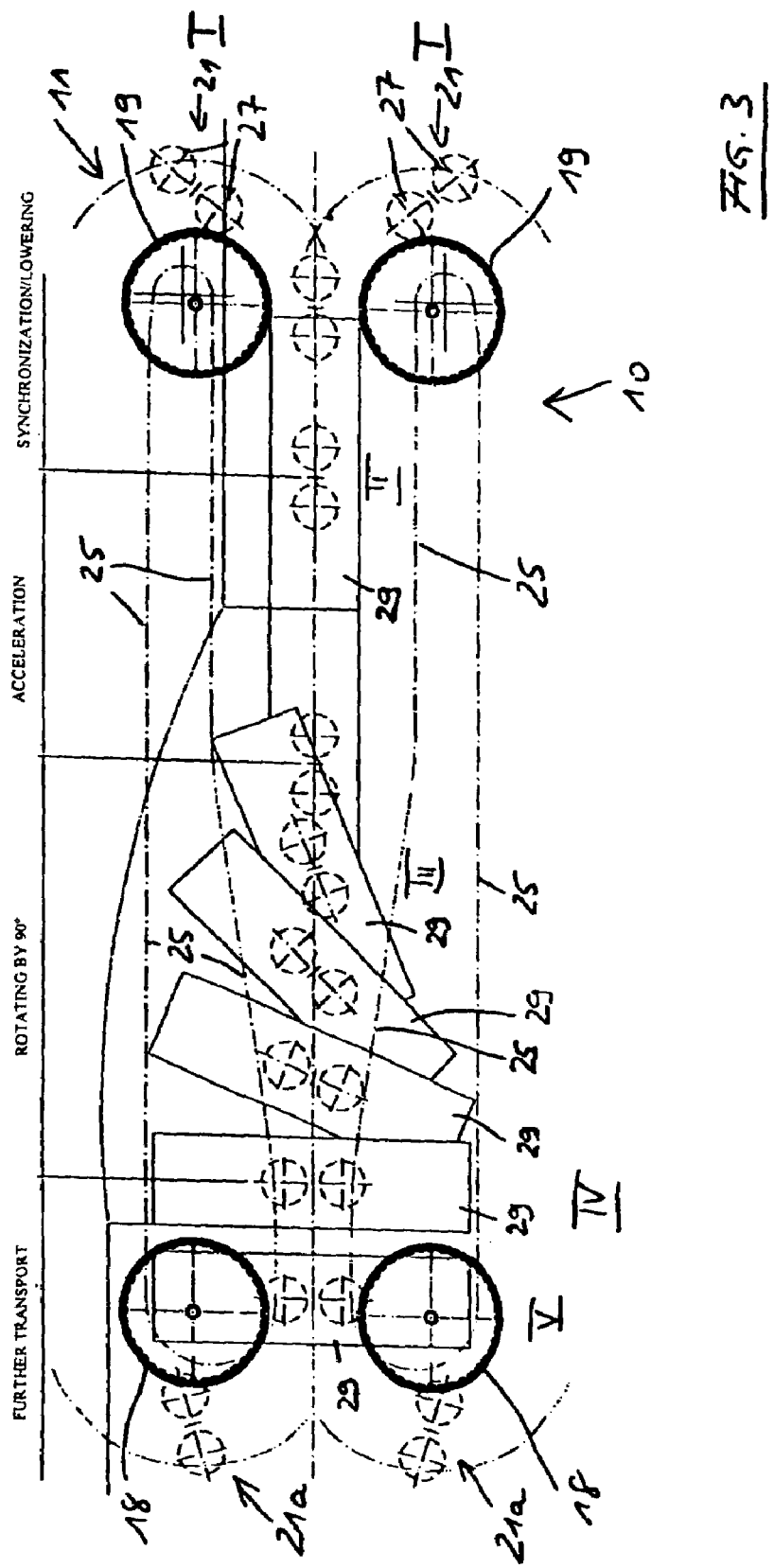

APPARATUS FOR SIMULTANEOUSLY CONVEYING AND ROTATING OBJECTS

CLAIM OF PRIORITY

Applicant hereby claims priority benefits under the provisions of 35 U.S.C. § 119, basing said claim of priority on European Patent Application Serial No. 05 014 325.4, filed Jul. 1, 2005. In accordance with the provisions of 35 U.S.C. § 119 and Rule 55(b), a certified copy of the above-listed European patent application will be filed before grant of a patent.

BACKGROUND OF THE INVENTION

The invention relates to an apparatus for simultaneously conveying and rotating objects, especially square-shaped objects, around a vertical axis, especially for turning objects 90 degrees. A first conveyor device conveys the objects into the area of a first conveyor-turning station adapted for conveying and turning the objects. A second conveyor device conveys the objects out of the area of the conveyor-turning station. The conveyor-turning station has a conveyor that rotates horizontally and at least one turning device with means for contacting and turning an object, also with an electrical drive for the conveyor-turning station.

An apparatus for conveying and turning objects, especially folded boxes, around a vertical axis, especially for turning objects by 90 degrees, is known from EP 1 020 359 A2, which is hereby incorporated herein. This prior apparatus has a single conveyor-turning station (called turning device there) and a number of turning devices.

In the prior apparatus, the articles or objects are supplied with consistent spacing to the conveyor-turning station, so that they can continuously, with unchanging rotation speed of the horizontally rotating conveyor, be detected by the means for contacting and can be turned 90 degrees. The contacting mechanisms have suction elements that are connected to a central air supply for all the suction elements of the conveyor-turning station. Objects are conveyed by the first conveyor to an area where suction elements turn the articles in a raised condition by 90 degrees, and all are then placed at the upstream end of the second conveyor. The objects are carried away by the second conveyor.

In this known device, the means for turning the objects can be controlled using a stationary linking guide, and there are also means for contacting the objects that can be lowered and lifted using a different stationary linking guide. A functionally similar device is shown in EP 1 020 359 A2, and can also be used for the present invention. Since this principle is not important to the invention, it will not be dealt with in more detail in the following.

SUMMARY OF THE INVENTION

The object of the present invention is to further develop an apparatus of the type described above in such a way that with it, objects can also be conveyed securely that are supplied to the conveyor-turning station with irregular spacing and can be turned during the further conveyor process.

The object is achieved by a device of the type described above that is characterized by the following features:
 the device has two conveyor-turning stations arranged next to each other for alternate conveying of the objects along the same or common conveyor path,
 each conveyor-turning station can be driven by means of its own electric motor, the speed of which can be controlled, and in the access area of the conveyor-turning stations, a device is arranged for detecting the position of the next object to be contacted and conveyed by the respective conveyor-turning station, whereby the detecting device controls the electric motors in such a way that upon detection of an object passing by, the detecting device triggers one electric motor, upon detecting the object following immediately after that passing object, the detecting device triggers the other electric motor.

A first object is thus supplied by way of the conveyor device to the two conveyor-turning stations, whereby a second object and analogously to this, third and fourth objects follow with completely different spacing. If the first object comes into the area of the two conveyor-turning stations that are arranged adjacent to each other relative to the conveying direction of the object, the detecting device detects the object, especially its leading contour. After that, the detecting device, which is especially designed as a light barrier, controls the electric motor of the associated one of the two conveyor-turning stations, the direction of rotation of which is located in a waiting position adjacent to the object. During the control of the electric motor of this conveyor-turning station, the electric motor is brought to the desired speed, and thus the conveyor of this conveyor-turning station is brought to the desired rotation speed that corresponds to the conveying speed of the object given to it by the first conveyor device, whereby a synchronization of the movements takes place. During this process, the turning device is thus rotated or swiveled by means of the horizontally rotating conveyor into the conveyor path of the object and the lowering occurs during the synchronization, so that the turning device contacts the object. An acceleration phase can follow in order to then cause the turning of the turning device with the result that the object is turned along with it accordingly. This object preferably involves a square-shaped object, especially a folded box. However, basically other object shapes are conceivable that are adapted for conveying and turning.

Preferably immediately before the point in time at which the turning device of one conveyor-turning station has taken the object, the turning device of the other conveyor-turning station following next in this area is brought into a waiting position corresponding to the waiting position of the first conveyor-turning station by driving the rotating conveyor assigned to this station. If the detecting device detects the second object conveyed to it by the first conveyor device, the electric motor of the second conveyor-turning station is triggered and by way of its rotating conveyor. The turning device in the waiting position is moved for the purpose of contacting the second object and subsequent turning, as described for the first object.

Thus with the apparatus according to the invention, it is not necessary to convey the objects at a defined distance with respect to each other to the conveyor-turning station and/or the conveyor-turning stations; the conveying of the objects can occur with any spacing.

It is also considered preferable if each conveyor-turning station has only two turning devices. The two turning devices of the respective conveyor-turning station especially have the same spacing from each other, related to the rotating path of the conveyor. If the respective conveyor-turning station with one of the turning devices reaches the area of the second conveyor device, the other turning device of this conveyor-turning station is already in the waiting position so that, under consideration of the two turning stations present, a turning device is always ready in the waiting position in order to convey and to turn an object detected by the detection device.

According to a special embodiment of the invention, it is provided that the respective electric motor for driving the conveyor-turning station is designed as a servomotor, especially as a servomotor with an absolute value sensor. A servomotor can be controlled highly dynamically and thus permits almost any running behavior of the respective horizontally rotating conveyor, thus an optimal synchronization of the movements of turning devices and objects and besides this, possibly also a desired acceleration of the object contacted by the turning device. The absolute value sensor makes possible information about the position of the conveyor even if the system is stopped.

The first conveying device can be driven especially by means of an electric motor, preferably by means of an electric motor with controllable speed. It is especially a case of an asynchronous motor. The motor can be controlled with frequency regulation, e.g., in a frequency range of 8.7 to 87 Hz. The second conveyor device is also preferably driven by means of an electric motor with controllable speed.

According to a preferred design of the invention, it is provided that the first conveyor device and/or the second conveyor device is designed as a conveyor line, especially as conveyor belts arranged at a spaced apart distance. Thus the objects, lying on two conveyor belts arranged at a distance from each other, are supplied to the conveyor-turning station and conveyed by a second conveyor device that is designed corresponding to the first conveyor device.

It is considered especially advantageous if a plate is arranged between the first conveyor device and the second conveyor device, whereby the turning of the respective object occurs in the area of the plate, especially with an object lying on the plate. Basically however, there could also be a possibility of producing not only contact between the turning device and the object by means of suction devices, but also to apply vacuum to the suction devices, in particular to lift the respective object by application of vacuum, so that during the turning it does not contact any substrates. With the use of a plate, thus during turning of the object on the substrate, it is generally not necessary to provide suction devices for which vacuum is supplied externally. The low suction force during lowering of the suction device onto the object is adequate to initiate a turning movement in the object. Preferably, two suction devices that can be brought into contact with the respective object are provided. No matter how the turning of the object occurs, including a gripping contact, the respective object is preferably turned around a vertical axis, which runs through the center of gravity of the object and/or the overall center of gravity of the object and of the product held therein.

Other characteristics of the invention are explained in the claims, the description of the figures and in the figures themselves, whereby it should be noted that all individual characteristics and all combinations of individual characteristics are part of the invention.

BRIEF DESCRIPTION OF THE DRAWINGS

In the figures, the invention is shown using a preferred embodiment, without being restricted thereby. In the drawings.

FIG. 2 shows an end view of the two conveyor-turning stations shown in FIG. 1 with the plate arranged under them for holding the objects; and FIG. 3 shows a top view of a functional representation to illustrate the method of operation of the two conveyor-turning stations.

Figure 1:
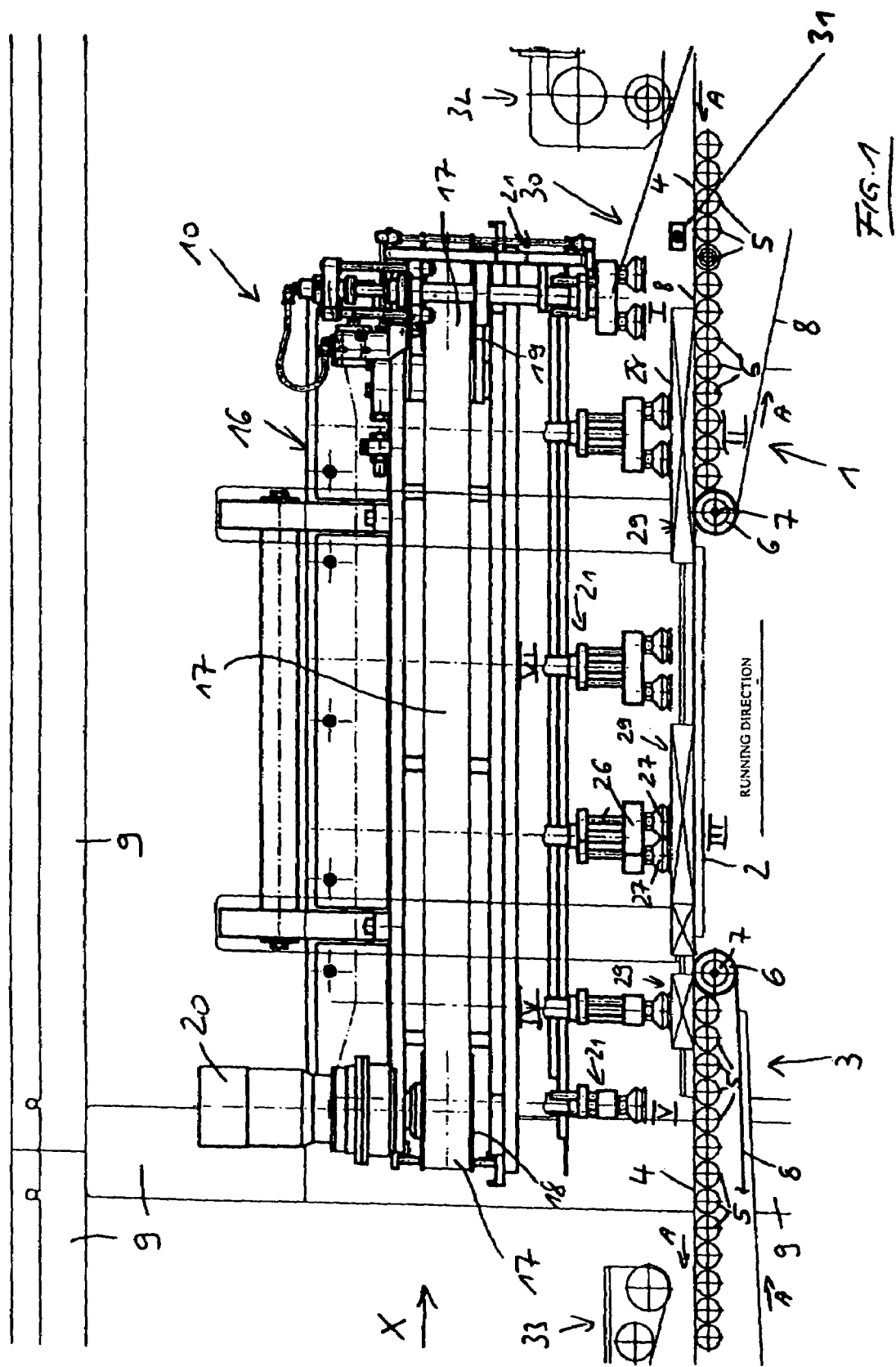
FIG. 1 shows a side view of the apparatus according to the invention for conveying and turning objects.

The structure of the device according to the invention for conveying and turning objects will first be explained using the illustration in FIGS. 1 and 2.

A first conveyor device 1, a plate 2 that is arranged following the first conveyor device 1 and a second conveyor device 3 that follows the plate immediately in the conveying direction are shown in FIGS. 1 and 2. The two conveyor devices 1 and 3 and the plate 2 have the same horizontally arranged contact plane 4.

The first conveyor device 1 has a number of support rollers 5 arranged parallel to each other and adjacent to each other and a driven deflecting roller 6 mounted adjacent to the plate 2. The deflecting roller 6 is driven by the electric motor with controllable speed that is designed as an asynchronous motor with controllable frequency. For example, it can be controlled in a frequency range from 8.7 to 87 Hz. The first conveyor device 1 has two conveyor belts 8 that are arranged at a predetermined lateral distance from each other. The upstream end of the first conveyor device 1 that is oriented away from the deflecting roller 6 is not shown.

The plate 2 is mounted so that it is stationary.

The second conveyor device 3 is designed similar to the first conveyor device 1, and thus has a number of support rollers 5 arranged adjacent to each other, a driven deflecting roller 6 and an asynchronous motor 7, and additionally two conveyor belts 8 arranged at a predetermined lateral distance from each other. The downstream end of this conveyor device that is oriented away from the deflecting roller 6 of the second conveyor device 3 is not shown.

The running direction of the conveyor belt 8 of the two conveyor devices 1 and 3 is shown by the arrow "A".

The first conveyor device 1, the plate 2 and the second conveyor device 3 are supported on a common machine frame 9.

Above the plate 2, the downstream end areas of the first conveyor device 1, and the upstream end of second conveyor device are two conveyor-turning stations 10 and 11 arranged next to each other in a side-by-side relationship. Turning stations 10 and 11 are designed so that they are symmetrical with respect to plane B-B, which runs perpendicular to the drawing plane as shown in FIG. 2. The two turning stations 10 and 11 are mounted in the machine frame 9 by way of an upper beam 12. Machine frame 9 is surrounded by a hood 13, having a hood section 14 mounted so it can swivel or rotate upwardly and downwardly relative to the fixed hood element 15.

The structure and the method of operation of the respective conveyor-turning station 10 and/or 11 are described in greater detail below.

A base frame 16 (FIG. 2) of the conveyor-turning station 10 and/or 11 is mounted in the beam 12, and supports a horizontally rotating turning conveyor 17 that is designed as a conveyor belt. The conveyor belt 17 is guided around two deflecting rollers 18 and 19, whereby the deflecting roller 18 that is arranged above the second conveyor device 3 can be driven by means of a servomotor 20 that is flange-mounted on the base frame 16. Two turning devices 21 are connected with the conveyor belt 17, whereby the distance of the two turning devices of the respective conveyor-turning station 10 and/or 11 corresponds to about half the rotation distance of the conveyor belt 17. The distances of the two turning devices 21 of these conveyor-turning stations are thus the same in both directions. Thus if one turning device 21 is located in the area of one end of the conveyor-turning station 10 and/or 11 oriented toward the deflecting roller 18, the other turning device 21 of this conveyor-turning station is located in the area of its other end, which is oriented toward the deflecting roller 19.

When the conveyor belt 17 rotates, the turning device 21 of the respective conveyor-turning station 10 and/or 11 moves between the two conveyor belts 17 of the two conveyor-turning stations 10 and 11 during movement in the "running direction" (of the objects to be conveyed) marked with the arrow "A" in FIG. 1, while in contrast in their return movement opposite the running direction, the turning devices 21 are located on the outside 22 of the respective conveyor-turning station 10 and/or 11. During movement of the turning devices 21 between the two conveyor belts 17 of the two conveyor-turning stations 10 and 11, the turning devices 21 are moved in the plane B-B (FIG. 2), which is positioned perpendicular to the drawing plane according to FIG. 2, along the same conveyor path.

The respective turning device 21 has, e.g., corresponding to the embodiment that is described in EP 1 020 359 A2, a vertically arranged guide rod 23 (FIG. 2) that can be lowered and raised vertically, whereby the raising and lowering of the guide rod 23 occurs by means of a known linking guide mechanism. Not only can the guide rod 23 be lowered and raised, but it also can be swiveled or rotated over another known linking guide by 90 degrees around the vertical axis 24 (the contour of the linking guide is shown in FIG. 3 with the reference number 25). In the area of its lower end, the respective guide rod 23 has a respective seat 26 which in turn, in the area of its lower end, holds two suction devices 27. These suction devices are connected, for example by means of an air passage in the guide rod 23 to a central vacuum connection. This construction is also disclosed in EP 1 020 359 A2.

The turning device 21 with its two suction elements is first lowered to the upper surface 28 of a square-shaped object 29, e.g., a folding box. Then, during conveying of the object 29 in the running direction shown in FIG. 1 by means of the linking guide responsible for the turning movement, the guide rod 23 and thus the two suction elements 27 are turned or rotated in order to reposition the guide rod 23 by 90 degrees. The turned object 29 is then released in the area of the second conveyor device 3. The suction elements 27 will be lifted from the object, and the further transport of the object occurs by means of the second conveyor device 3. The turning device 21 is then transferred by means of the conveyor belt 17 back to the initial position for contacting another object 29.

The apparatus according to the present invention differs from the known devices described above in that a plate 2 is provided between the two conveyor devices 1 and 3 in the area in which the turning of the object occurs, and namely when the object rests on the plate 2.

In the access area 30 of the two conveyor-turning stations 10 and 11, the apparatus according to the present invention also has a light barrier 31, the light beam of which extends vertically to the page plane of the drawing in FIG. 1, thus perpendicular to the conveyor direction of the object 29 during conveying to the two conveyor-turning stations 10 and 11. The light barrier 31 is used to detect the position of the next object 29 from the respective conveyor-turning station 10 and/or 11 to be contacted and conveyed. In this process, the light barrier 31 triggers the servomotors 20 in such a way that during detection of the object 29 passing by, the light barrier 31 triggers one servomotor 20, e.g., the servomotor of the conveyor-turning station 10, while in contrast when the object 29 that immediately follows this passing object 29 is detected, the light barrier 31 triggers the servomotor 20 of the other conveyor-turning station 11. Both servomotors 20 are equipped with an absolute value sensor.

FIG. 2 shows only three of the four turning devices 21 of the two conveyor-turning stations 10 and 11, because the turning device 21 disposed between the two conveyor belts 17 of the two conveyor-turning stations 10 and 11 hides the other turning device disposed there.

FIG. 1 shows, for conveyor-turning station 10, a partial cycle of one of the two turning devices 21 provided there, namely beginning at the waiting position I, shown on the right, after that Position II, in which the turning device 21 is swiveled in between the two conveyor belts 17 and the synchronization and lowering of the suction element 27 to the object. In positions I and II, the turning device 21 is located above the first conveyor device. Position III follows, in which the object 29 is rotated 90 degrees from the longitudinal position into the transverse position, relative to the running direction "A" shown in FIG. 1. In position IV, the turning of the object 29 has been completed, and it is already located in the area of the second conveyor device 3. In position V, the turning device 21 with the suction element 27 is transferred into the raised position. Finally in position VI, the turn of the turning device 21 has been shifted into the waiting position along the outside 22 of the conveyor-turning station 10.

FIG. 3 shows the turning process and the kinematic relationships during the rotation or turning of an object 29. For clarification, in this figure, the two turning devices 21 of each conveyor-turning station 10 and/or 11 are shown. In this figure, for the waiting position of the turning device 21 of one conveyor-turning station 10 and/or 11, the position of the other turning device is shown, whereby this turning device is assigned the reference number 21a. It is also clear from FIG. 3 that the distance between the two turning devices 21 and 21a of the respective conveyor-turning station 10 and/or 11 corresponds to about half the rotation path of the conveyor.

The respective conveyor-turning station 10 and/or 11 can be driven by means of its own servomotor 20 with controllable speed. If the light barrier or curtain 31 in the access area 30 of the two conveyor-turning stations 10 and 11, detects an object 29 that is predominantly oriented longitudinally, thus in the running direction "A" according to FIG. 1, the servomotor 20 of the conveyor-turning station 10 is activated, and its conveyor belt 17 is accelerated to that rotation speed within the shortest possible time that corresponds to the conveyor speed of the object, which is known on the basis of the conveyor speed of the first conveyor device 1. During this synchronization phase, when the turning device 21 is driven in between the two conveyor belts 17 of the two conveyor-turning stations 10 and 11, the two suction elements 27 of this turning device 21 are lowered to the upper surface 28 of object 29, which is thereby conveyed between the suction elements 27 and conveyor belts 8 of the first conveyor device 1 at the same speed. Then, using a subsequent control of the servomotor 20 of the other conveyor-turning station 11, it is triggered in such a way that immediately the turning device 21 of the conveyor-turning station 11 disposed adjacent to the first conveyor device 1 is transferred to the waiting position I shown in FIG. 3, and is thus available for detecting the next object 29, whereby the activation occurs again by the light barrier 31, which detects the next object. The object 29 detected according to the description above by means of one turning device 21 of the conveyor-turning station 10 is now turned 90 degrees (see position III, to which reference is also made in FIG. 1), wherein the object turned 90 degrees is shown by position IV. Position V shows the turned object after the lifting of the turning device according to the corresponding position V in FIG. 1. From there, there is a further transport by means of the second conveyor device 3. Acceleration of the object 29 occurs in the section between positions II and III. The object 29 that is then conveyed will be conveyed by means of the conveyor-turning station 11 along the same conveyor path as the previously conveyed object 29 by means of conveyor-turning station 10.

FIG. 1 also shows upper runners 32 and 33. The upper runner 32 is given the function of positioning the object 29 between itself and the first conveyor device so the object 29 can be transferred in a defined manner into the access area 30. The upper runner 33 is given the task of conveying the turned object in a defined way in cooperation with the second conveyor device 3.

The relationship of length and width of the square-shaped object to be transported is 2:1.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An apparatus for conveying and simultaneously rotating articles about a generally vertical axis, comprising:
   first and second conveyor-turning stations disposed in a side-by-side relationship and configured for alternately conveying articles along a common conveyor path and for rotating the articles; said first and second conveyor-turning stations, including:
      first and second horizontally oriented conveyors having first and second turning devices configured to grasp and rotate the articles; and
      first and second variable speed motors for separably driving said first and second conveyor-turning stations;
   a first conveyor for conveying articles to said first and second conveyor-turning stations, and including an access area;
   a second conveyor for conveying articles away from said first and second convey-turning stations; and
   a detector disposed adjacent said access area for detecting the position of the articles to be conveyed and rotated by an associated one of said first and second conveyor-turning stations; said detector being operably connected with said first and second motors, whereby upon detection of a first passing article, said detector activates said first motor, and upon detecting a second article immediately following the first article, activates said second motor.

2. An apparatus as set forth in claim 1, wherein:
said first and second motors comprise servomotors, each having an absolute value sensor.

3. An apparatus as set forth in claim 2, wherein:
said first and second conveyor-turning stations are configured such that immediately after said first turning device contacts an article, said second turning device is shifted to a ready position adjacent to said access area.

4. An apparatus as set forth in claim 3, wherein:
said first and second motors comprise variable speed electric motors.

5. An apparatus as set forth in claim 4, wherein:
said detector comprises a light barrier.

6. An apparatus as set forth in claim 5, wherein:
said first and second turning devices are spaced apart a distance substantially equal to one half of the rotational path of said first and second conveyors.

7. An apparatus as set forth in claim 6, wherein:
said first and second turning devices include suction elements adapted to contact upper surfaces of the articles.

8. An apparatus as set forth in claim 7, including:
a plate disposed between said first and second conveyors adjacent said first and second turning stations.

9. An apparatus as set forth in claim 8, wherein:
said first and second turning devices are configured to rotate the articles about a generally vertical axis which passes through the center of gravity of the articles.

10. An apparatus as set forth in claim 9, wherein:
said first and second conveyors comprise longitudinally spaced apart conveyor belts.

11. An apparatus as set forth in claim 1, wherein:
said first and second conveyor-turning stations are configured such that immediately after said first turning device contacts an article, said second turning device is shifted to a ready position adjacent to said access area.

12. An apparatus as set forth in claim 1, wherein:
said first and second motors comprise variable speed electric motors.

13. An apparatus as set forth in claim 1, wherein:
said detector comprises a light barrier.

14. An apparatus as set forth in claim 1, wherein:
said first and second turning devices are spaced apart a distance substantially equal to one half of the rotational path of said first and second conveyors.

15. An apparatus as set forth in claim 1, wherein:
said first and second turning devices include suction elements adapted to contact upper surfaces of the articles.

16. An apparatus as set forth in claim 1, including:
a plate disposed between said first and second conveyors adjacent said first and second turning stations.

17. An apparatus as set forth in claim 1, wherein:
said first and second turning devices are configured to rotate the articles about a generally vertical axis which passes through the center of gravity of the articles.

18. An apparatus as set forth in claim 1, wherein:
said first and second conveyors comprise longitudinally spaced apart conveyor belts.

* * * * *